US008015471B2

(12) United States Patent
Hepler

(10) Patent No.: US 8,015,471 B2
(45) Date of Patent: Sep. 6, 2011

(54) SYMBOL RATE HARDWARE ACCELERATOR

(75) Inventor: Edward L. Hepler, Malvern, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1089 days.

(21) Appl. No.: 11/776,610

(22) Filed: Jul. 12, 2007

(65) Prior Publication Data

US 2008/0016287 A1 Jan. 17, 2008

Related U.S. Application Data

(60) Provisional application No. 60/830,909, filed on Jul. 14, 2006.

(51) Int. Cl.
*G11C 29/00* (2006.01)
(52) U.S. Cl. .......................................... 714/766; 712/221
(58) Field of Classification Search .................. 714/766; 712/221
See application file for complete search history.

(56) References Cited

U.S. PATENT DOCUMENTS

| | | | |
|---|---|---|---|
| 5,454,095 A | 9/1995 | Kraemer et al. | |
| 5,845,322 A | 12/1998 | Leung | |
| 6,629,187 B1 | 9/2003 | Krueger et al. | |
| 2003/0185306 A1 | 10/2003 | Macinnis et al. | |
| 2006/0067394 A1 | 3/2006 | Chen | |
| 2007/0074218 A1* | 3/2007 | Levy et al. | 718/102 |
| 2007/0198815 A1* | 8/2007 | Liu et al. | 712/221 |

FOREIGN PATENT DOCUMENTS

| | | |
|---|---|---|
| EP | 1 416 658 | 5/2004 |
| WO | 2005/099157 | 10/2005 |

OTHER PUBLICATIONS

3GPP, *3rd Generation Partnership Project; Technical Specification Group GSM/EDGE Radio Access Network; Channel Coding (Release 7)*, 3GPP TS 45.003 V7.0.0 (Apr. 2006).
3GPP, *3rd Generation Partnership Project; Technical Specification Group GSM/EDGE Radio Access Network; Channel Coding (Release 7)*, 3GPP TS 45.003 V7.1.0 (Feb. 2007).
3GPP, *3rd Generation Partnership Project; Technical Specification Group GSM/EDGE Radio Access Network; Multiplexing And Multiple Access On The Radio Path (Release 7)*, 3GPP TS 45.002 V7.4.0 (May 2007).

(Continued)

Primary Examiner — Sam Rizk

(57) ABSTRACT

A hardware accelerator includes a first buffer, a second buffer, address generator(s), a translation read-only memory (ROM), a cyclic redundancy check (CRC) generator, a convolutional encoder and a controller. The first and second buffers store information bits. The address generator(s) generate(s) an address for accessing the first buffer, the second buffer and a shared memory architecture (SMA). The translation ROM is used in generating a translated address for accessing the first buffer and the second buffer. The controller sets parameters for the CRC generator, the convolutional encoder and the address generator, and performs a predefined sequence of control commands for channel processing, such as reordering, block coding, parity tailing, puncturing, convolutional encoding, and interleaving, on the information bits by manipulating the information bits while moving the information bits among the first buffer, the second buffer, the SMA, the CRC generator, and the convolutional encoder.

15 Claims, 5 Drawing Sheets

OTHER PUBLICATIONS

3GPP, *3rd Generation Partnership Project; Technical Specification Group GSM/EDGE Radio Access Network; Multiplexing And Multiple Access On The Radio Path (Release 7)*, 3GPP TS 45.002 V7.0.0 (Apr. 2006).

3GPP, *3rd Generation Partnership Project; Technical Specification Group GSM/EDGE Radio Access Network; Physical Layer On The Radio Path; General Description (Release 7)*, 3GPP TS 45.001 V7.3.0 (Jun. 2006).

3GPP, *3rd Generation Partnership Project; Technical Specification Group GSM/EDGE Radio Access Network; Physical Layer On The Radio Path; General Description (Release 7)*, 3GPP TS 45.001 V7.4.0 (May 2007).

3GPP, *3rd Generation Partnership Project; Technical Specification Group GSM/EDGE Radio Access Network; Physical Layer On The Radio Path; General Description (Release 6)*, 3GPP TS 45.001 V6.8.0 (May 2007).

3GPP, *3rd Generation Partnership Project; Technical Specification Group GSM/EDGE Radio Access Network; Physical Layer On The radio Path; General Description (Release 6)*, 3GPP TS 45.001 V6.7.0 (Nov. 2005).

3GPP, *3rd Generation Partnership Project; Technical Specification Group GSM/EDGE Radio Access Network; Modulation (Release 6)*, 3GPP TS 45.004 V6.0.0 (Jan. 2005).

3GPP, *3rd Generation Partnership Project; Technical Specification Group GSM/EDGE Radio Access Network; Radio Transmission And Reception (Release 7)*, 3GPP TS 45.005 V7.5.0 (Apr. 2006).

3GPP, *3rd Generation Partnership Project; Technical Specification Group GSM/EDGE Radio Access Network; Radio Transmission And Reception (Release 7)*, 3GPP TS 45.005 V7.10.0 (May 2007).

Bindra, "Novel Architectures Pack Multiple DSP Cores On-Chip", Special Report, Digital Signal Processing, Part 2, (Dec. 3, 2001).

Leung et al., "Development of Programmable Architecture for Base-Band Processing", Proceedings of the 26th Euromicro Conference, 2000., vol. 1, pp. 362-367, (2000).

3GPP, *3rd Generation Partnership Project; Technical Specification Group GSM/EDGE Radio Access Network; Physical Layer On The Radio Path; General Description (Release 6)*, 3GPP TS 45.001 V6.8.0 (May 2007).

3GPP, *3rd Generation Partnership Project; Technical Specification Group GSM/EDGE Radio Access Network; Physical Layer On The Radio Path; General Description (Release 6)*, 3GPP TS 45.001 V6.7.0 (Nov. 2005).

3GPP, *3rd Generation Partnership Project; Technical Specification Group GSM/EDGE Radio Access Network; Modulation (Release 6)*, 3GPP TS 45.004 V6.0.0 (Jan. 2005).

3GPP, *3rd Generation Partnership Project; Technical Specification Group GSM/EDGE Radio Access Network; Radio Transmission And Reception (Release 7)*, 3GPP TS 45.005 V7.5.0 (Apr. 2006).

3GPP, *3rd Generation Partnership Project; Technical Specification Group GSM/EDGE Radio Access Network; Radio Transmission And Reception (Release 7)*, 3GPP TS 45.005 V7.10.0 (May 2007).

* cited by examiner

SYMBOL RATE HARDWARE ACCELERATOR

CROSS REFERENCE TO RELATED APPLICATION

This application claims the benefit of U.S. Provisional Application No. 60/830,909 filed Jul. 14, 2006, which is incorporated by reference as if fully set forth.

FIELD OF INVENTION

The present invention is related to wireless communication systems. More particularly, the present invention is related to a symbol rate hardware accelerator for wireless communication.

BACKGROUND

A wireless transmit/receive unit (WTRU) for second generation (2G) wireless communication systems typically includes a digital signal processor (DSP) for signal processing and symbol rate processing. The 2G WTRU usually has a control processor, (such as an advanced RISC machine (ARM)), to deal with layer 1 (L1) control and protocol stack processing.

FIG. 1 is a block diagram of a conventional WTRU 100 for 2G systems, (such as global system for mobile communication (GSM), global packet radio services (GPRS) and enhanced data rate for GSM evolution (EDGE)). The WTRU 100 includes a channel processing unit 110, a burst generation and modulation unit 120, a transmitter 130 and an antenna 140. The channel processing unit 110 includes a block coding unit 112, a convolutional encoder 114, a reordering and partitioning unit 116, and an interleaver 118. The burst generation and modulation unit 120 includes an encryption unit 122, a burst generator 124, and a modulator 126. FIG. 1 shows only a transmit side of the WTRU 100, but the WTRU 100 also includes components in a receive side that correspond to the transmit side.

Information bits 111 are first processed by the block coding unit 112, (e.g., a cyclic redundancy check (CRC) unit). Parity bits are added to the information bits 111 by the block coding unit 112. The information bits with the parity bits 113 are then processed by the convolutional encoder 114. The convolutional encoder 114 performs convolutional coding on the bits 113 to generate encoded bits 115. The encoded bits 115 are reordered and partitioned by the reordering and partitioning unit 116. The reordered and partitioned bits 117 are then interleaved by the interleaver 118. The interleaved bits 119 are encrypted by the encryption unit 122. The encrypted bits 123 are sent to the burst generator 124. The burst generator 124 generates bursts 125 from the encrypted bits 123. Burst multiplexing is also performed by the burst generator 124. The bursts 125 are then processed by the modulator 126. Modulated symbols 127 are then transmitted by the transmitter 130 via the antenna 140.

FIG. 2, which is taken from third generation partnership project (3GPP) technical specification (TS) 45.003 section 2.1, shows processing of information bits for some of the channels in GSM, GPRS and EDGE. A plurality of channels are supported in 2G systems. FIG. 2 shows processing of information bits for a traffic channel for enhanced full rate speech (TCH/EFS), a traffic channel for full rate speech (TCH/FS), a traffic channel for half rate speech (TCH/HS), a data traffic channel, and a packet data traffic channel (PDTCH).

Referring to FIGS. 1 and 2, processing of information bits for a TCH/FS is explained as an illustrative example. A speech coder (not shown in FIG. 1), either full rate or enhanced full rate, delivers to the channel processing unit a sequence of blocks of data. In case of a TCH/FS or TCH/EFS, one block of data corresponds to one speech frame. Each block contains 260 information bits, including 182 class 1 bits (protected bits) and 78 class 2 bits (notprotected bits). The 260 bits of each block is processed by the block coding unit. The first 50 class 1 bits are protected by three (3) parity bits for error detection. The class 1 input bits and parity bits are reordered and four (4) tailing bits are appended to the end. The block coding unit outputs 267 bits including three parity bits and four tailing bits. Class 1 bits of the 267 bits are encoded with the ½ rate convolutional coding by the convolutional encoder. The convolutional encoder outputs 456 bits of encoded bits. The 456 encoded bits are reordered and partitioned by the reordering and partitioning unit. The reordering and partitioning unit outputs 8 blocks of bits. The 8 blocks of bits are then block diagonally interleaved by the interleaver. The reordering and interleaving are performed based on a predefined table.

As a dual-mode WTRU supporting both 2G and third generation (3G) services is increasingly used in the market, physical resources need to be shared for 2G and 3G processing for cost reduction and power saving. As data rates increase, and modulation techniques and receiver algorithms become more complex, the processing requirements that must be supported by the DSP continue to grow. Other functions supported by the DSP, such as voice codecs, are also becoming more complex. Simply increasing the frequency of the DSP to support the added functionality will create other problems, including higher power dissipation, increased demands on the memory subsystem.

A potential solution to this problem is to offload some of the processing from the DSP into a hardware accelerator. Traditional hardware accelerators are controlled by the DSP, usually by using direct memory access (DMA) techniques or programmed I/O to get input data into the accelerator, register writes to start the accelerator, and DMA techniques or programmed I/O to access the results of the accelerator. Traditional hardware accelerators are typically "hardwired" to perform a specific function, so moving functionality from a DSP to a hardware accelerator results in a loss of flexibility (compared to software running on the DSP) and the need for major hardware changes if a change in functional requirements occurs.

SUMMARY

The present invention is related to a symbol rate hardware accelerator for wireless communication. While the symbol rate functions are being offloaded from the DSP (or control processor), flexibility to accommodate changes or new channel types is maintained. The hardware accelerator includes a first buffer, a second buffer, at least one address generator, a translation read-only memory (ROM), a CRC generator, a convolutional encoder, other potential operational units, an interface to a shared memory architecture (SMA), (accessible by the DSP and/or the control processor), and a controller. The interface to an SMA provides a means to fill the first buffer from the shared memory and send results from either the first buffer or the second buffer back to the shared memory. It also provides a source for commands that the accelerator will interpret. The first and second buffers store information bits. The address generator(s) generate(s) addresses for accessing the first buffer and the second buffer.

The translation ROM is used in generating a translated address for accessing the first buffer and the second buffer. The controller sets parameters for the CRC generator, the convolutional encoder, the address generator(s), and potentially other operational units, and performs a predefined sequence of control commands for channel processing on the information bits by manipulating the information bits and the processed information bits while moving the information bits and the processed information bits among the shared memory, the first buffer, the second buffer, the CRC generator, and the convolutional encoder. The channel processing includes at least one of first reordering, block coding, second reordering, parity tailing, puncturing, convolutional encoding, and interleaving.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 5 shows an exemplary diagonal interleaving pattern in accordance with the present invention.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention may be implemented in any type of wireless communication system, as desired. By way of example, the present invention may be implemented in any type of GSM, EDGE, GPRS system, or any other type of wireless communication system.

In accordance with the present invention, the general purpose DSPs conventionally used for channel processing, (i.e., symbol rate processing for transmit processing and/or receive processing), is replaced with a hardware accelerator that is specifically designed to perform the channel processing in a WTRU or a base station. The channel processing flows for different types of channels, a subset of which are shown in FIG. 2, are similar, but specific parameters are different in each channel processing step, (i.e., parameters for block coding, convolutional coding, reordering and interleaving are different for different channel types), and the order in which they are performed may be different.

Figure 1:
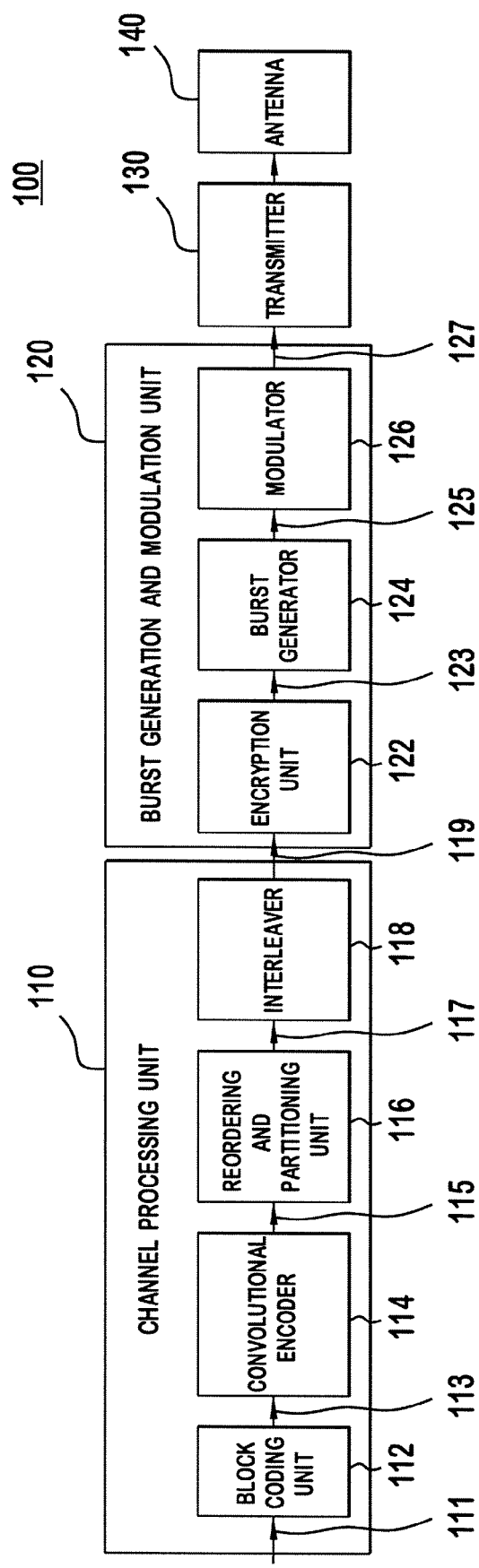
FIG. 1 is a block diagram of a conventional WTRU for 2G systems.
Figure 2:
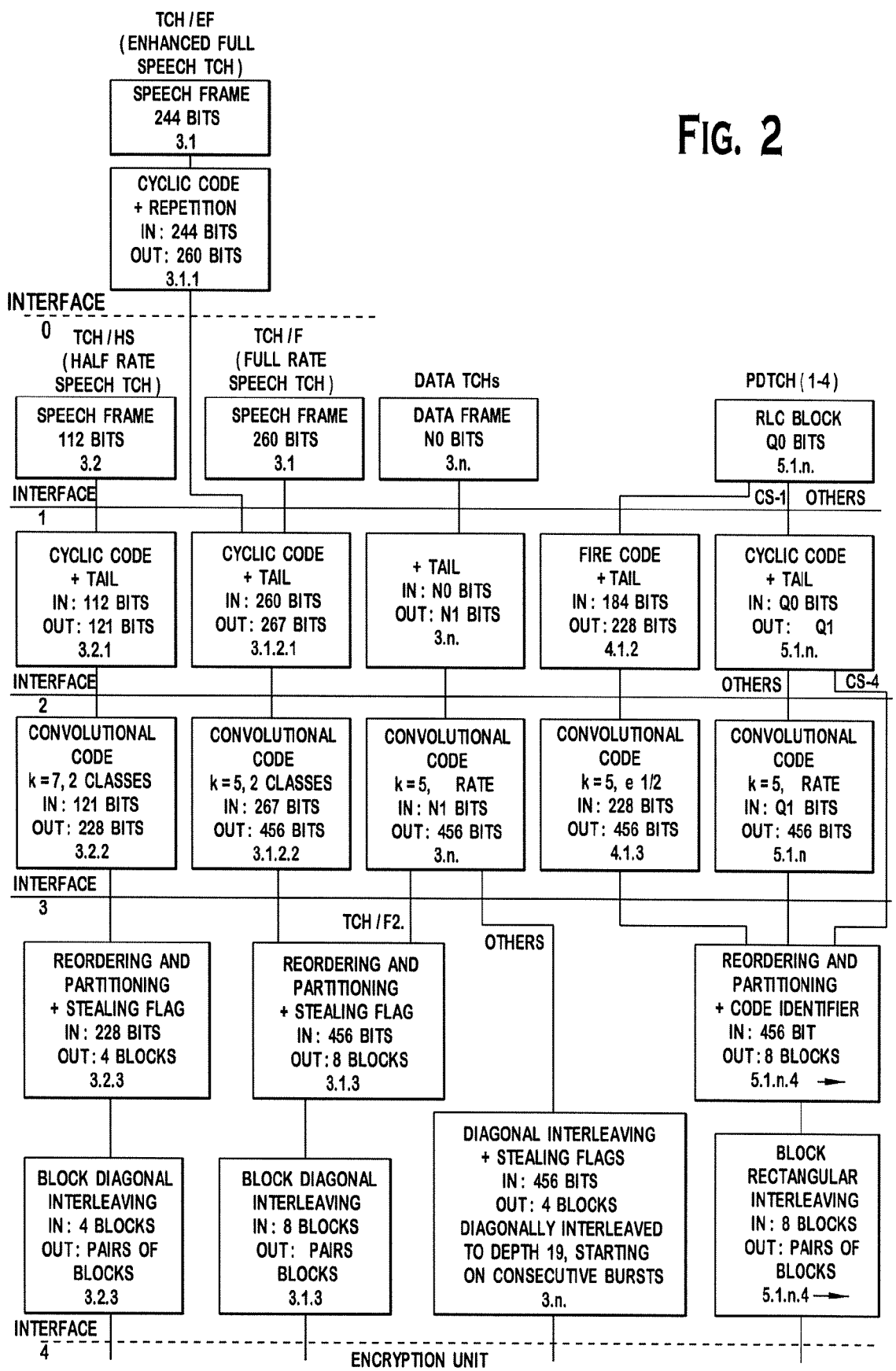
FIG. 2 shows conventional processing of information bits for a plurality of channels in GSM, GPRS and EDGE.
Figure 3:
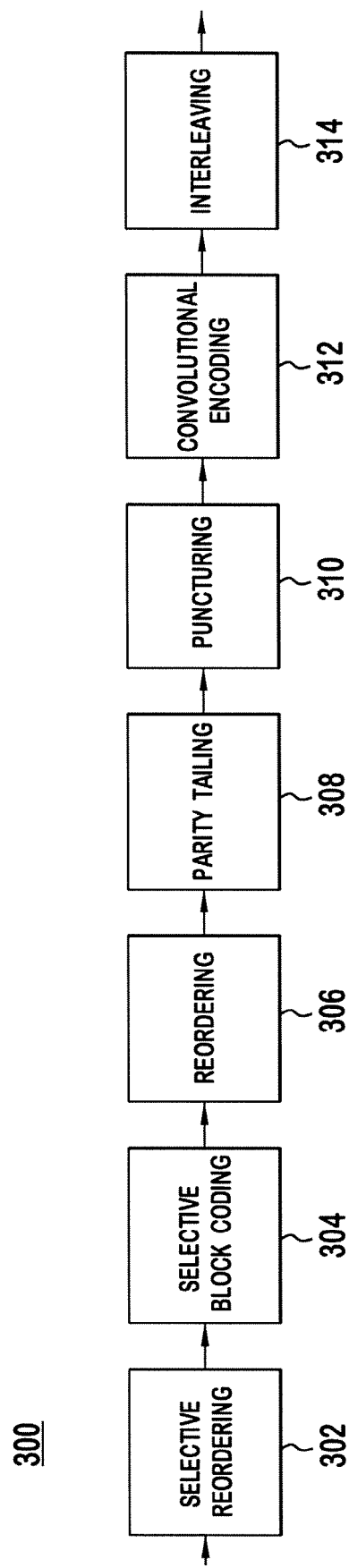
FIG. 3 shows an exemplary data processing flow performed by the hardware accelerator in accordance with the present invention.

In accordance with the present invention, the channel processing flows for the channel types, such as shown in FIG. 2, are distilled to a single flow of operation. FIG. 3 shows an exemplary data processing flow performed by the hardware accelerator in accordance with the present invention. A typical channel processing process 300 performed by the hardware accelerator includes selective reordering 302, selective block coding 304, reordering 306, parity tailing 308, puncturing 310, convolutional encoding 312, and interleaving 314. Selective reordering is performed for reordering a certain portion of bits in a bit stream. Selective block coding is block coding performed on a certain portion of bits. Both selective reordering and normal reordering may be performed depending on a channel type. Parity tailing is for attaching parity bits to a block of bits by block coding. Puncturing is performed to remove certain bits from a bit stream for rate matching. Convolutional encoding is performed for error detection and correction. Interleaving is performed for protection against burst error. It should be noted that the processing shown in FIG. 3 may be differently defined for different types of channels. It should also be noted that FIG. 3 shows only the transmit processing for simplicity, but the present invention is equally applicable to the receive processing. In accordance with the present invention, a sequence of commands with different parameters is defined for each channel type and the sequence of commands is executed by the hardware accelerator.

Figure 4:
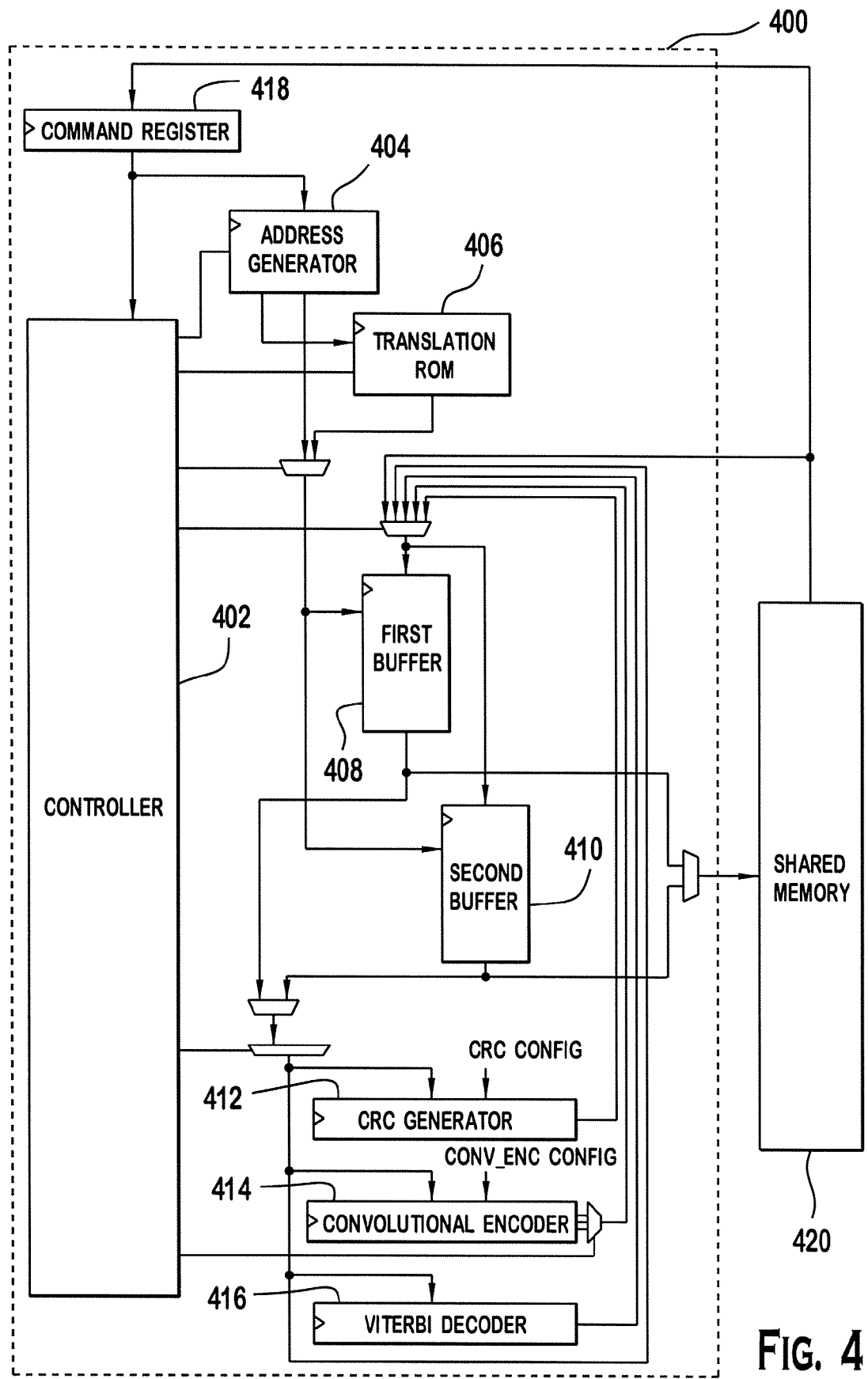
FIG. 4 shows a hardware accelerator and an SMA in accordance with the present invention.

FIG. 4 shows a hardware accelerator 400 and an SMA 420 in accordance with the present invention. The hardware accelerator 400 includes a controller 402, an address generator 404, a translation read-only memory (ROM) 406, a first buffer 408, a second buffer 410, a CRC generator 412, a convolutional encoder 414, a convolutional decoder 416, (i.e., Viterbi decoder), and a command register 418. It should be noted that the hardware accelerator 400 may include additional operation units necessary to perform channel processing. The hardware accelerator 400 performs a specific sequence of bit manipulation defined for each channel type. The hardware accelerator 400 manipulates bit streams, (i.e., bit field), in accordance with a control word to perform a specific function. The control word is included in a control block that resides in an SMA 420. The control word is retrieved from the SMA 420 and stored in the command register 418 before being interpreted by the controller 402.

A typical operation performed by the hardware accelerator 400 includes copying a data block from the SMA 420 into the first buffer 408, moving the data from the first buffer 408 to the second buffer 410 while performing a first manipulation, moving the data from the second buffer 410 to the first buffer 408 while performing a second manipulation, repeating the data moving between the first buffer 408 and the second buffer 410 while performing manipulation on the data as many times as needed, and then moving the resulting data from the ending buffer, (either the first buffer 408 or the second buffer 410), to the SMA 420.

This operation requires a very simple hardware structure, and the hardware accelerator 400 works at 1 or 2 clocks per bit. The control sequences are controlled by software and pre-defined for each channel type. Only SMA pointers need to be updated before invoking the hardware accelerator. The controller 402 maintains the control sequences.

The hardware accelerator 400 first sets parameters for the CRC generator 412, the convolutional encoder 414, the viterbi decoder 416, and the address generator 404. The hardware accelerator 400 then repeats at least one of the following commands N times:

1) Copy: move data from the first buffer 408 and the second buffer 410 or from the second buffer 410 to the first buffer 408;
2) Copy_translate_src: retrieve data from one buffer (either the first buffer 408 or the second buffer 410) using an address generated via the translation ROM 406 and put the retrieved data to the other buffer (either the first buffer 408 or the second buffer 410) using a linear address;

3) Copy_translate_dst: retrieve data from one buffer (either the first buffer 408 or the second buffer 410) using a linear address and put the retrieved data to the other buffer (either the first buffer 408 or the second buffer 410) using an address generated via the translation ROM 406;

4) Generate_CRC: move data from one of the first buffer 408 and the second buffer 410 to the CRC generator 412;

5) Generate_CRC_translate; move data from one of the first buffer 408 and the second buffer 410 to the CRC generator 412 using an address generated by the translation ROM 406;

6) Conv_Encode_XXXXXX; move data from one of the first buffer 408 and the second buffer 410 through the convolutional encoder 414 using a pattern "XXXXXX" to determine which convolutional encoder structure to include in the movement;

7) From_CRC; move data from the CRC generator 412 to one of the first buffer 408 and the second buffer 410;

8) To_SMA; move data from one of the first buffer 408 and the second buffer 410 to the SMA 420; and 9) From_SMA: move data from the SMA 420 to one of the first buffer 408 and the second buffer 410.

Exemplary control sequences for performing the channel processing for the TCH/FS is explained hereinafter. The processing flow for the TCH/FS is shows in FIG. 2. It is assumed that the data, (i.e., 260 bits of one speech frame), is already moved from the shared memory to the first buffer 408. A control sequence for selective block coding, (i.e., selective CRC encoding), is as follows:

1) Set CRC parameters;
2) Clear address counter; and
3) Rpt 50; Generate CRC;

CRC parameters are set by the "Set CRC parameter" command. An address counter, (linear address counter), is initialized by the "Clear address counter" command. The first 50 bits are then moved from the first buffer 408 to the CRC generator 412 by the "Rpt 50; Generate CRC" command, leaving the calculated CRC in the CRC generator.

A control sequence for reordering and parity tailing is as follows:

1) Set Indx_Base to label "Rearrange_insert_CRC_3.1.2.1" of the translation ROM;
2) Clear address counter; and
3) Rpt 189; Copy_translate.

As stated before, three (3) parity bits are generated from the first 50 class 1 bits, and the 182 class 1 bits and three parity bits are reordered, and four (4) parity bits are appended to the end. The above three commands are for reordering the class 1 bits and the parity bits and appending the tailing bits. An index base is set to the predefined values, (i.e., as specified in section 3.1.2.1 in 3GPP TS 45.003 v.7.10). The linear address counter is initialized again by the "Clear address counter" command. The 189 bits, (the information bits, parity bits and tailing bits) are moved from the first buffer 408 to the second buffer 410 using an address generated via the translation ROM 406 by the command "Rpt 189; Copy_translate" command.

A control sequence for convolutional encoding as follows:

1) Set Conv_encode parameters;
2) Clear address counter;
3) Rpt 189; Leng 2; conv_encode_000011; and
4) Rpt 78; Copy.

Parameters for the convolutional encoding are set by the "Set Conv_encode parameters" command. The address counter is initialized by "Clear address counter" command. The 189 class 1 bits are moved from the second buffer 410 through the convolutional encoder 414 using a pattern "000011" for convolutional encoding. The encoded output is put to the first buffer 408. 78 class 2 bits are moved from the second buffer 410 to the first buffer 408 by the Rpt 78; Copy" command (since they are not protected via encoding).

A control sequence for reordering and partitioning is as follows:

1) Set Indx_Base to label "Interleave_3.1.3_Tbl_1_P169" of the translation ROM;
2) Clear address counter; and
3) Rpt 456; Copy_translate.

The 456 encoded bits are reordered and partitioned according to the predefined rule, (i.e., based on a predefined table). The index base is set to the predefined values, (i.e., as specified in Table 1 in 3GPP TS 45.003 v.7.10). The address counter is initialized by "Clear address counter" command. The 456 encoded bits are moved from the first buffer 408 to the second buffer 410 using an address derived via the translation ROM 406 to accomplish the reordering and partitioning. The reordered and partitioned bits in the second buffer 410 are then moved to the SMA.

The above processing requires approximately 16 control block words, approximately 908 ROM words, and approximately 1,151 clock ticks. At 52 MHz, 1,500 clock ticks equals to 28.85 μs, which is only 5% of one GSM timeslot. In accordance with the present invention, a significant savings in cost and power is possible.

The hardware accelerator 400 preferably uses 6 SMA sources, (i.e., 6 different areas of the shared memory), for storing the reordered and partitioned bits from up to six (6) different channels for interleaving. The interleaving may be diagonal interleaving.

Figure 5:
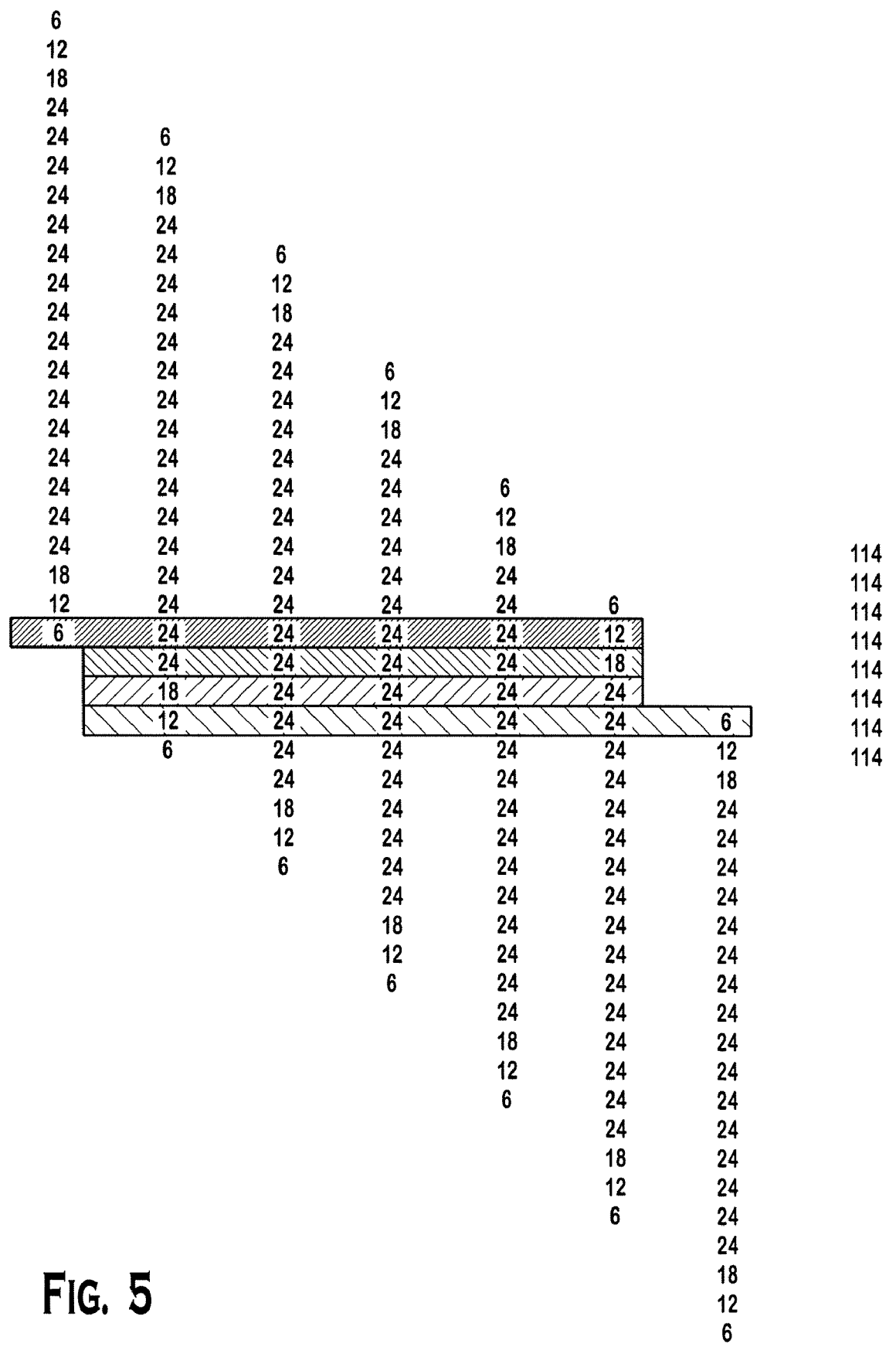

FIG. 5 shows an exemplary diagonal interleaving pattern in accordance with the present invention. The reordered and partitioned bits from each channel are written in the SMA in column, (conceptually, not physically), and a burst is generated by reading the bits from the SMA in row, (conceptually, not physically), whereby a diagonal interleaving is performed. Each column represents reordered and partitioned bits from one channel. The reordered and partitioned bits for up to 6 different channels are stored in separate areas of the SMA. One frame of data from each channel has a total of 456 bits. Each row represents a burst. Each burst includes 114 bits. The bits in one channel are interleaved over 22 bursts. As shown in FIG. 5, there are four (4) different interleaving patterns: {12, 24, 24, 24, 24, 6}, {6, 24, 24, 24, 24, 12}, {24, 24, 24, 24, 18}, and {18, 24, 24, 24, 24}. Each of the four patterns includes bits from up to 6 different channels. It should be noted that the patterns shown in FIG. 5 are exemplary, and that any other patterns may be implemented as an alternative in accordance with the present invention. The diagonal interleaving shown in FIG. 5 may be implemented by a separate hardware accelerator.

Low level ciphering may be provided in the form of a linear feedback shift register (LFSR)-based stream XOR'd with burst data, and symbols are received from a transmit (Tx) chip by a front end root raised cosine (RRC) filter.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A hardware accelerator for performing channel processing on information bits for wireless transmission and reception, the hardware accelerator being in communication with a shared memory, the hardware accelerator comprising:
    a first buffer and a second buffer for storing the information bits and processed information bits;
    at least one address generator for generating an address for accessing the first buffer and the second buffer;
    a translation read-only memory (ROM) for generating a translated address for accessing the first buffer and the second buffer;
    an interface for accessing the shared memory;
    a cyclic redundancy check (CRC) generator for performing a block coding on one of the information bits and the processed information bits to generate parity bits;
    a convolutional encoder for performing convolutional encoding on one of the information bits and the processed information bits; and
    a controller configured to generate control signals to set parameters for the CRC generator, the convolutional encoder and the address generator, and perform a predefined sequence of control commands for channel processing on the information bits by manipulating the information bits and the processed information bits while moving the information bits and the processed information bits between the first buffer and the second buffer back and forth, wherein moving data between the buffers includes moving the data through one of the shared memory, the cyclic redundancy check, CRC, generator, and the convolutional encoder, and manipulating the data in accordance with a control word to perform a specific function.

2. The hardware accelerator of claim 1 wherein the controller is further configured to set parameters for each of a plurality of channels and perform the predefined sequence of control commands for said plurality of channels.

3. The hardware accelerator of claim 1 wherein the channel processing includes at least one of first reordering, block coding, second reordering, parity tailing, puncturing, convolutional encoding, and interleaving.

4. The hardware accelerator of claim 1 wherein the controller is further configured to use six shared memory architecture (SMA) sources for storing the processed information bits from up to six different channels.

5. The hardware accelerator of claim 4 wherein the controller is further configured to perform diagonal interleaving.

6. A wireless communication device comprising the hardware accelerator of claim 4 and a separate hardware accelerator, the second hardware accelerator being configured to perform diagonal interleaving.

7. The hardware accelerator of claim 1, wherein the
    controller is further configured to perform at least one of:
    retrieving data from one of the first buffer and the second buffer using an address generated via a translation ROM and transmitting the retrieved data to the other one of the first and second buffers;
    retrieving data from one of the first and second buffers and transmitting the retrieved data to the other one of the first and second buffers using an address generated via the translation ROM;
    moving data from one of the first buffer and the second buffer to the CRC generator;
    moving data from one of the first buffer and the second buffer through the convolutional encoder;
    moving the data from the CRC generator to one of the first buffer and the second buffer;
    moving data from one of the first buffer and the second buffer to the shared memory; and
    moving data from the shared memory to one of the first buffer and the second buffer.

8. The hardware accelerator of claim 7, wherein the data is moved from one of the first buffer and the second buffer to the CRC generator using an address generated by the translation ROM.

9. A method for performing channel processing with a hardware accelerator in a wireless communication device, the method comprising:
    receiving information bits; and
    performing channel processing on the information bits using the hardware accelerator, the hardware accelerator performing a predefined sequence of commands for channel processing while moving the information bits and processed information bits between a first buffer and a second buffer back and forth, wherein moving data between the buffers includes moving the data through one of a shared memory, a cyclic redundancy check, CRC, generator, and a convolutional encoder, and manipulating the data in accordance with a control word to perform a specific function.

10. The method of claim 9 wherein parameters are set for each of a plurality of channels and the predefined sequence of control commands are performed for said plurality of channels.

11. The method of claim 9 wherein the channel processing includes at least one of first reordering, block coding, second reordering, parity tailing, puncturing, convolutional encoding, and interleaving.

12. The method of claim 9 wherein the hardware accelerator uses six shared memory architecture (SMA), sources for storing the processed information bits from up to six different channels.

13. The method of claim 12 wherein the interleaving is a diagonal interleaving.

14. The method of claim 9, further comprising at least one of:
- retrieving data from one of the first buffer and the second buffer using an address generated via the translation ROM and transmitting the retrieved data to the other one of the first and second buffers;
- retrieving data from one of the first and second buffers and transmitting the retrieved data to the other one of the first and second buffers using an address generated via the translation ROM;
- moving data from one of the first buffer and the second buffer to the CRC generator;
- moving data from one of the first buffer and the second buffer through the convolutional encoder;
- moving data from the CRC generator to one of the first buffer and second buffer;
- moving data from one of the first buffer and the second buffer to the shared memory; and
- moving data from the shared memory to one of the first buffer and the second buffer.

15. The method of claim 9, wherein the data is moved from one of the first buffer and the second buffer to the CRC generator using an address generated by a translation read-only memory (ROM).

* * * * *